Oct. 19, 1971  U. CAPRA  3,613,255
VEHICULAR DRYING APPARATUS
Filed March 3, 1970  4 Sheets-Sheet 1

INVENTOR
UBERTO CAPRA
BY
Karl J. Ross
ATTORNEY

Oct. 19, 1971 U. CAPRA 3,613,255
VEHICULAR DRYING APPARATUS
Filed March 3, 1970 4 Sheets-Sheet 2

INVENTOR
UBERTO CAPRA
BY
Karl J. Ross
ATTORNEY

Oct. 19, 1971 U. CAPRA 3,613,255
VEHICULAR DRYING APPARATUS
Filed March 3, 1970 4 Sheets-Sheet 4

INVENTOR
UBERTO CAPRA
BY Karl F. Ross
ATTORNEY

United States Patent Office
3,613,255
Patented Oct. 19, 1971

3,613,255
VEHICULAR DRYING APPARATUS
Uberto Capra, Vicenza, Italy, assignor to Ceccato &
Co. S.p.A., Alte Ceccato, Vicenza, Italy
Continuation-in-part of application Ser. No. 860,663,
Sept. 24, 1969. This application Mar. 3, 1970,
Ser. No. 16,067
Claims priority, application Italy, Mar. 5, 1969,
13,660/69
Int. Cl. F26b 21/00
U.S. Cl. 34—54       10 Claims

ABSTRACT OF THE DISCLOSURE

A frame, movable with reference to a vehicle to be dried, carries an elongate nozzle at right angles to the path of relative motion, the nozzle having a slot trained upon a vehicular surface and flanked by a pair of mobile flaps controlling a switch for reversing the operation of a motor normally tending to move the nozzle toward the vehicle. Reversal of this motion occurs when a flap touches a vehicular surface or when air emitted by the nozzle slot is reflected by the vehicle toward the flaps with a sufficient force to indicate an overly close approach of the nozzle toward the surface to be dried.

---

This application is a continuation-in-part of my copending application Ser. No. 860,663 filed Sept. 24, 1969.

My present invention relates to an apparatus for forcibly drying a vehicle in a fixed or mobile vehicular washing station, e.g. as described in my prior application Ser. No. 707,836 filed Feb. 23, 1968, now Patent No. 3,500,487.

It is well known that the parts of a vehicle which are most difficult to dry by an air flow are those whose surfaces are parallel or nearly parallel to the ground, such as the hood, roof and trunk, because drops of water present in these areas can be dried only by the use of powerful air jets.

Various drying arrangements exist which share the disadvantage that a rather tall frame with accompanying drying mechanisms carried high above ground level must be provided to permit the drying of high-rising vehicles such as trucks; it thus becomes necessary to use high-powered electric blowers to provide an air jet sufficiently powerful to dry vehicles of substantially lesser height.

In my above-identified application Ser. No. 860,663, I have disclosed a vertically movable blower support whose position is controlled by a feeler assembly contacting an oncoming vehicle as the latter and the support are relatively displaced along a predetermined path. The feeler asssembly, in oscillating about an axis transverse to the vehicular path, reverses the operation of a drive motor which normally tends to lower the blower support into the path of the vehicle. Thus, the feelers limit the approach of the blower outlet or outlets toward the vehicle surface, e.g. by closing a switch on being swung from a normal position by contact with a vehicular surface.

Since repeated physical engagement of the feelers with the vehicle may be harmful to the appearance of the latter, owing to the possibility of scratches and of deposition of adhering dust particles on the wet surface, my present invention has for its object the provision of an improved system of this general type wherein such physical contact is reduced to a minimum.

Another object is to provide means for maintaining a predetermined but readily adjustable minimum distance between a nozzle outlet and the surface of a vehicle upon which an air stream from that outlet is to be trained.

In accordance with the present improvement, I provide a support such as a conventional portal frame which is offset from the path of a vehicle to be dried and which carries a nozzle having one or more outlets facing the vehicle, these outlets being connected with a source of drying air for discharging an air stream; one or more sensing elements, responsive to a reflected air flow from a vehicular surface close to the nozzle outlet, are disposed adjacent that outlet and control a switch for reversing the operation of a drive motor or other positioning means to maintain a predetermined minimum distance between the nozzle and such vehicular surface.

In its broader aspect, the invention is applicable to elongate nozzles extending both horizontally and vertically, generally at right angles to the vehicular path, above the vehicle or laterally thereof. With a horizontal nozzle suspended from the portal frame, the positioning means serving to lower and/or to raise the nozzle may utilize the force of gravity, e.g. by the use of weights as described in my application Ser. No. 707,836. If a reversible electric or fluid-drive motor is employed for this purpose, this motor may be controlled by a delay network preventing unduly rapid reversal (hunting) so that the nozzle will not begin to reapproach the vehicular surface until it has been removed to a certain distance from it.

In accordance with a more specific feature of my invention, the sensing element or elements have a normal position and two off-normal positions on opposite sides thereof, one of these off-normal positions being occupied under the pressure of the reflected air stream whereas the other off-normal position is brought about by contact between the sensor and the vehicle as the latter first enters the drying stage (or as the portal frame moves into line with it). This initial contact will generally be with a substantially vertical vehicle surface, such as the radiator grill, where the slight impact will not have any objectionable effect. As the nozzle is then retracted upwardly or laterally outwardly, it will be kept clear of the top and side surfaces of the vehicle. If another transverse surface intervenes, as in the case of a tall truck being dried by a nozzle suspended from above, physical contact may occur once more between the sensor and the vehicle body but will cease as soon as the nozzle has risen above that body. It may be useful, as disclosed in my copending application Ser. No. 860,663 and as more fully described hereinafter, to interrupt the relative longitudinal motion of the nozzle support and the vehicle if the sensor is kept off-normal for a prolonged period (depending on the speed of relative displacement) to prevent the nozzle itself from striking the vehicle.

For reasons of balance, and in order to allow for relative motion between the frame and the vehicle in either direction, the sensing means according to my invention advantageously include a pair of symmetrically positioned flaps flanking the outlet slot of the nozzle; this slot, of course, need not be continuous but could be interrupted at one or more locations.

The above and other features of my invention will be described in greater detail hereinafter with reference to the accompanying drawing in which.

Figure 1:
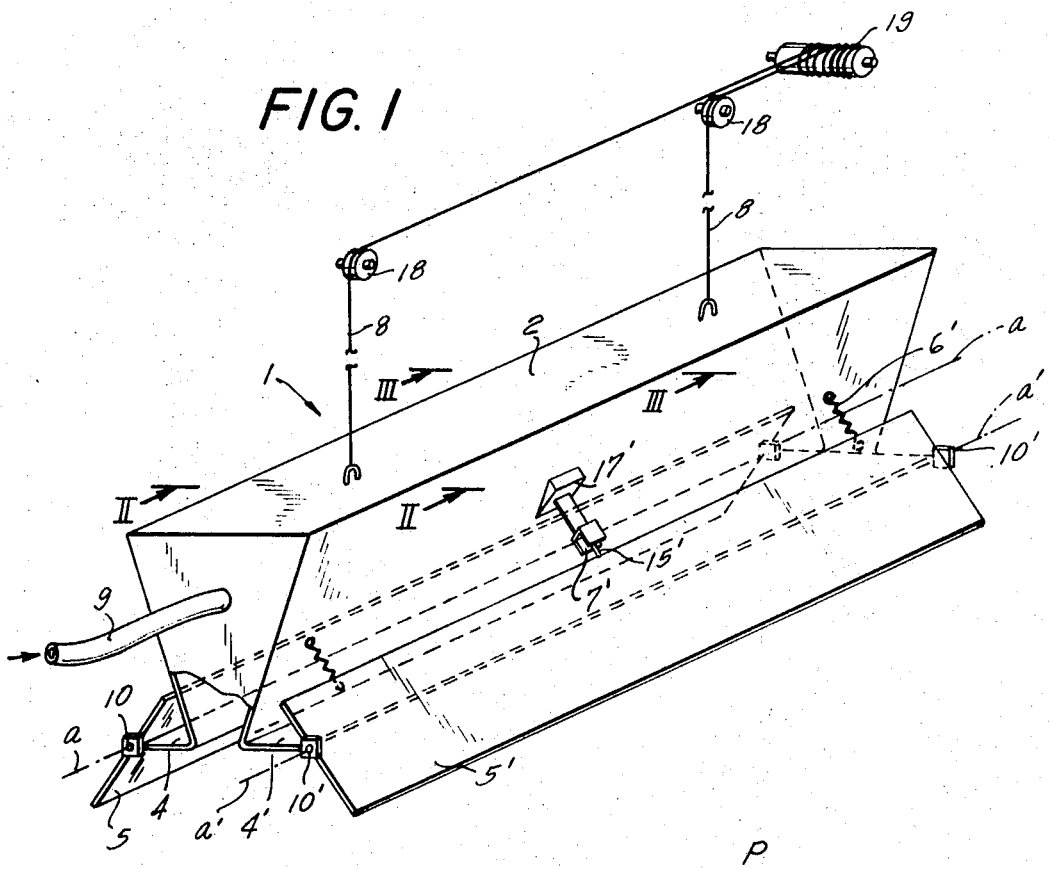
FIG. 1 is a somewhat diagrammatic perspective view of a nozzle with a pair of sensing flaps according to my invention.
Figures 2, 3:
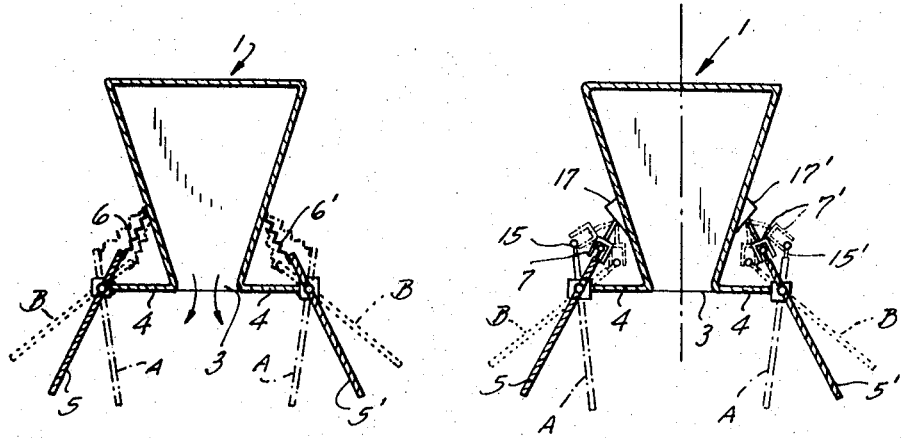
FIGS. 2 and 3 are cross-sectional views respectively taken on the lines II—II and III—III of FIG. 1.
Figure 4:
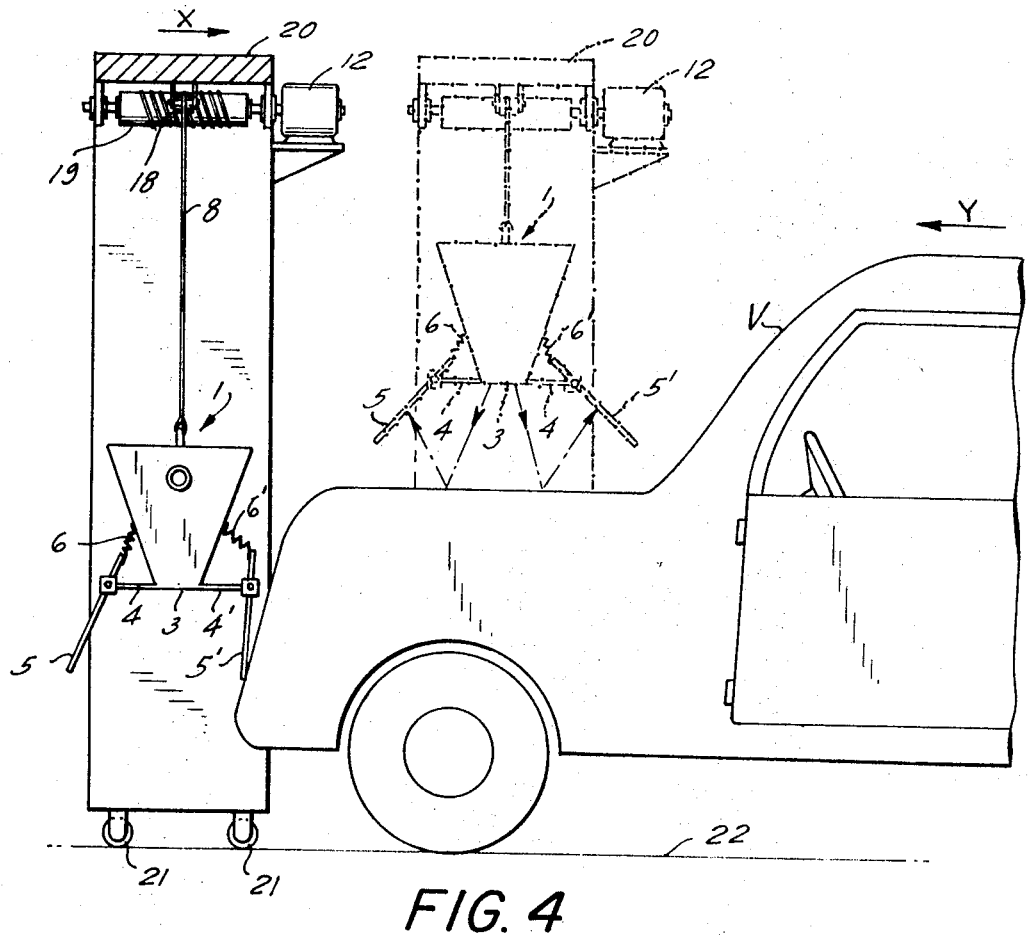
FIG. 4 is a side-elevational view of a vehicle in the process of being dried by the apparatus shown in FIGS. 1–3.
Figure 6:
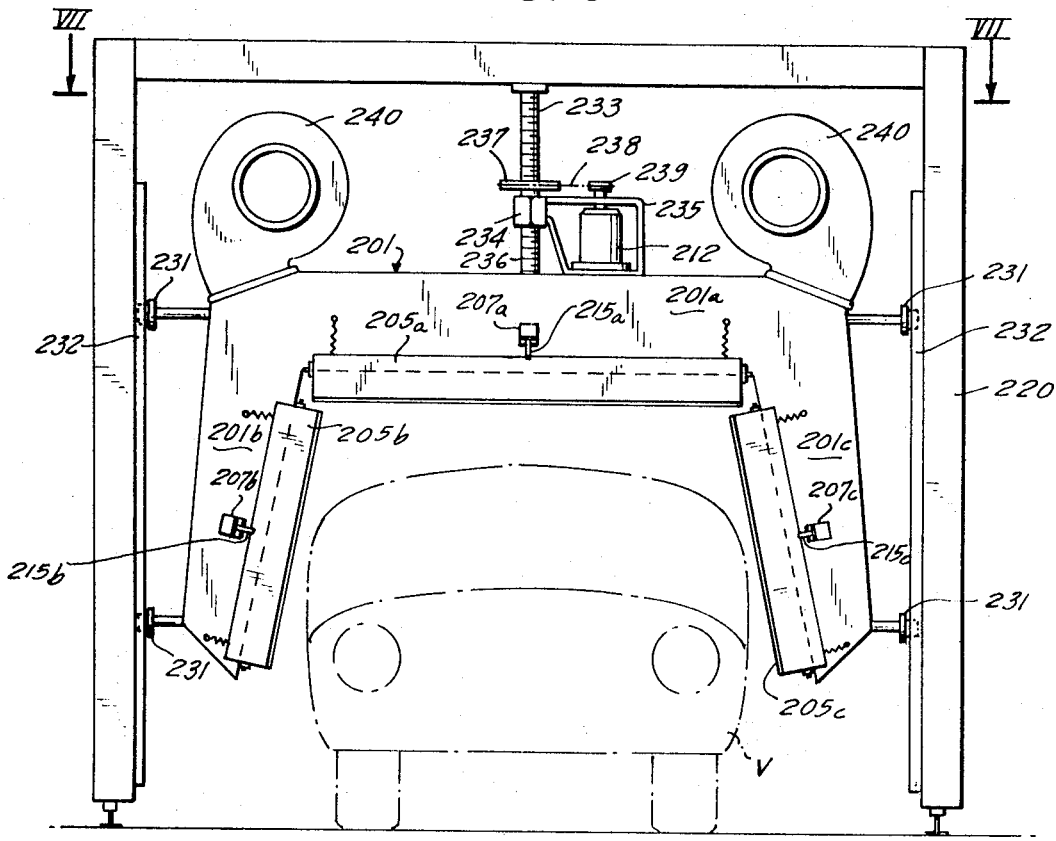
FIG. 6 is a front-elevational view of a drying apparatus generally similar to that of my application Ser. No. 860,663 but incorporating the novel features of FIGS. 1–5.

Reference will first be made to FIGS. 1–4 illustrating the basic features of my invention. An elongate nozzle 1 comprises a sheet-metal body 2 of generally triangular or trapezoidal profile, the front and rear walls of this body diverging downwardly toward a slot 3 for the discharge of a stream of drying air onto a vehicle V (FIG. 4). The interior of body 2 constitutes a plenum chamber into which air under pressure is admitted from a blower, not shown, via a flexible conduit 9; such a blower or blowers may also be mounted directly on the nozzle body, e.g. as illustrated in FIG. 6 described hereinafter.

Nozzle 1 is suspended from a portal frame 20 (FIG. 4), straddling the path of vehicle V, by a pair of cables 8 which pass around rollers 18 on the lintel of the frame and are wound on a capstan 19 driven by a reversible motor 12. This motor normally operates in a sense lowering the nozzle 1 to a certain level above ground where a limit switch, tripped by the nozzle body 1 or by one of the cables, arrests the motor as more fully described below with reference to FIG. 8.

The longitudinal walls of nozzle body 2 terminate in a pair of horizontal shelves 4, 4' integral with lugs 10, 10' in which a pair of symmetrical flaps 5, 5' are pivotally journaled for swinging about respective axes a, a' parallel to slot 3. These flaps, which like slot 3 extend over substantially the full length of the nozzle body, are biased by respective springs 6, 6' into a normal angular position, illustrated in full lines in FIGS. 2 and 3. In that normal position, the flaps 5 and 5' include an acute angle of preferably less than 45° but more than 15° with a longitudinal plane of symmetry P passing through the slot 3; as here specifically illustrated, this angle is about 30°.

The upper longitudinal edges of the inclined flaps carry respective contact elements 15, 15' which are straddled by associated bifurcate switch elements 7, 7' attached to nozzle body 2 with the aid of resilient tongues 17, 17'. The mounting of the springs 6, 6' and the tongues 17, 17' is so correlated that the contact elements 15, 15' are separated from both prongs of associated switch elements 7, 7' in the normal flap position described above: the resiliency of these springs and tongues, however, allows the flaps to be deflected both downwardly and upwardly, i.e. into a first off-normal position A and a second off-normal position B as illustrated in chain-dotted and point-dotted lines, respectively. In either of these positions, or in fact upon any appreciable swing of the flap from its normal position, a contact is closed between elements 7, 15 or 7', 15' to energize the motor 12 (FIG. 4) in the reverse sense whereby nozzle 1 is lifted to a higher level. This occurs, for example, in the position illustrated in full lines in FIG. 4 where the flap 5' is shown to have encountered the front end of vehicle V and to have been deflected thereby into its off-normal position A (FIGS. 2 and 3) as the vehicle and the frame 20 move relatively to each other as indicated by arrows X and Y. This relative motion can be brought about by driving the vehicle through the stationary frame or by displacing the frame toward the vehicle, the frame being shown supported for this purpose by rollers 21 riding on rails 22.

The operation of motor 12 in a nozzle-elevating direction continues until the flap 5' has cleared the front of the vehicle and is restored by its biasing springs 6' to its normal position. The concurrent movement of vehicle V in the direction Y or of frame 20 in the direction X places the nozzle 1 above the hood of the vehicle as illustrated in dot-dash line in FIG. 4. With the motor again operating normally to pay out additional lengths of cables 8, the nozzle 1 is lowered toward the hood until the sheet of air issuing from its outlet slot 3 is deflected from the vehicle surface with sufficient force to swing the flaps 5 and 5' outwardly (into position B of FIGS 2 and 3) whereupon motor 12 once more reverses to elevate the nozzle. In this manner, the distance between the nozzle and the vehicle varies only within certain limits, the nozzle following the contour of the vehicle in riding up along its windshield and thereafter sweeping across the vehicle roof. These motions can be performed without physical contact between the nozzle flaps and the vehicle if the speed of motor 12 is properly correlated with the rate of relative displacement of the vehicle and the portal frame. As the nozzle moves off the rear of the vehicle, the air pressure upon flaps 5 and 5' ceases whereby the cables 8 are again payed out to lower the nozzle to its minimum level.

Figure 5:
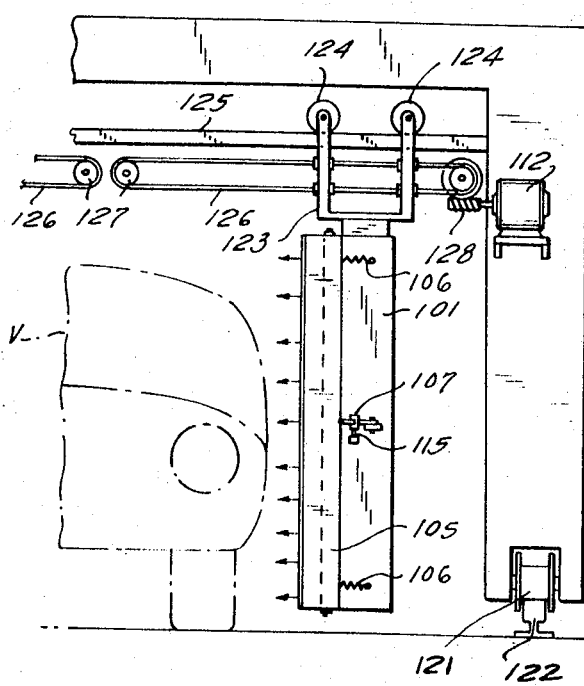
FIG. 5 is a fragmentary end view of a modified apparatus according to my invention.

FIG. 5 shows how the same principle can be applied to a vertical nozzle 101 serving to dry one of the sides of the vehicle, this nozzle being suspended from a carriage 123 with wheels 124 rolling on a rail 125 along the lintel of a portal frame 120. A second such nozzle, symmetrical mounted on frame 120, is used for the opposite side of a vehicle V passing through the frame 120. Carriage 123 and its companion carriage, not shown, are driven by endless belts 126 wound around rollers 127, these belts being independently movable by respective motors 112 (only one shown) via transmissions 128. Nozzle 101 is of basically the same construction as the nozzle 1 shown in FIGS. 1–4, with a pair of flaps 105 (only one of which is visible) biased by springs 106 and carrying contact elements 115 cooperating with switch elements 107. Frame 120 is again shown supported on rollers 121 riding on rails 122.

In the operation of the system of FIG. 5, motor 112 is normally energizable in a sense driving the carriage 123 inwardly until a limit switch arrests it near the centerline of the vehicular path. As before, a deflection of flaps 105 by direct contact or by reflected air moves the nozzle away from the vehicle body into a position within a predetermined distance range from the lateral surfaces of that body.

Figure 7:
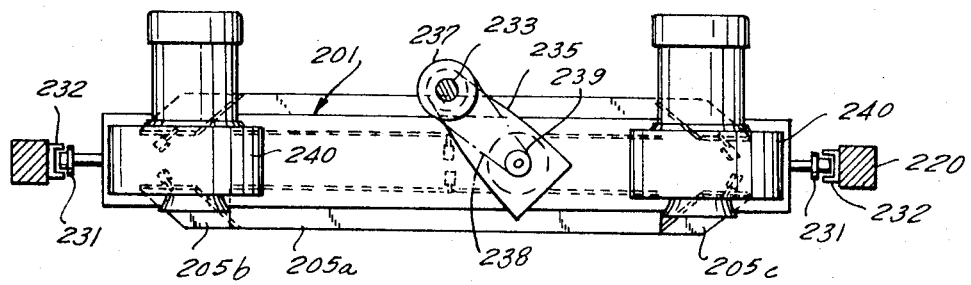
FIG. 7 is a horizontal cross-sectional view taken on the line VII—VII of FIG. 6.

FIGS. 6 and 7 show a frame 220 with a composite nozzle 201 suspended from its lintel, this nozzle having a horizontal portion 201a and two nearly vertical portions 201b, 201c bracketing the vehicle V. Each of these portions is provided with a pair of respective flaps 205a, 205b, 205c for the control of a motor 212 in the aforedescribed manner; the corresponding switch means (207a, 215a; 207b, 215b; 207c, 215c) are connected in parallel so that motor 212 operates to raise the nozzle 201 whenever any of these flaps approaches too close to the vehicle V. In this instance, the nozzle body is shown laterally guided in frame 220 by rollers 231 engaging vertical tracks 232; the nozzle is suspended from the frame by a hoisting mechanism including a leadscrew 233, a nut 234 engaging this leadscrew and a bracket 235 carrying the motor 212, this bracket being rigid with the nozzle body and with a sleeve 236 in which the nut 234 is rotatably journaled in axially fixed position. Nut 234 is integral with a sprocket wheel 237 which is driven by motor 212 through a chain 238 and another sprocket wheel 239 keyed to the motor shaft.

Two electric blowers 240 are mounted on the body of nozzle 201 to discharge into its plenum chamber from which air can pass to all the outlet slots of nozzle portions 201a, 201b, 201c.

Figure 8:
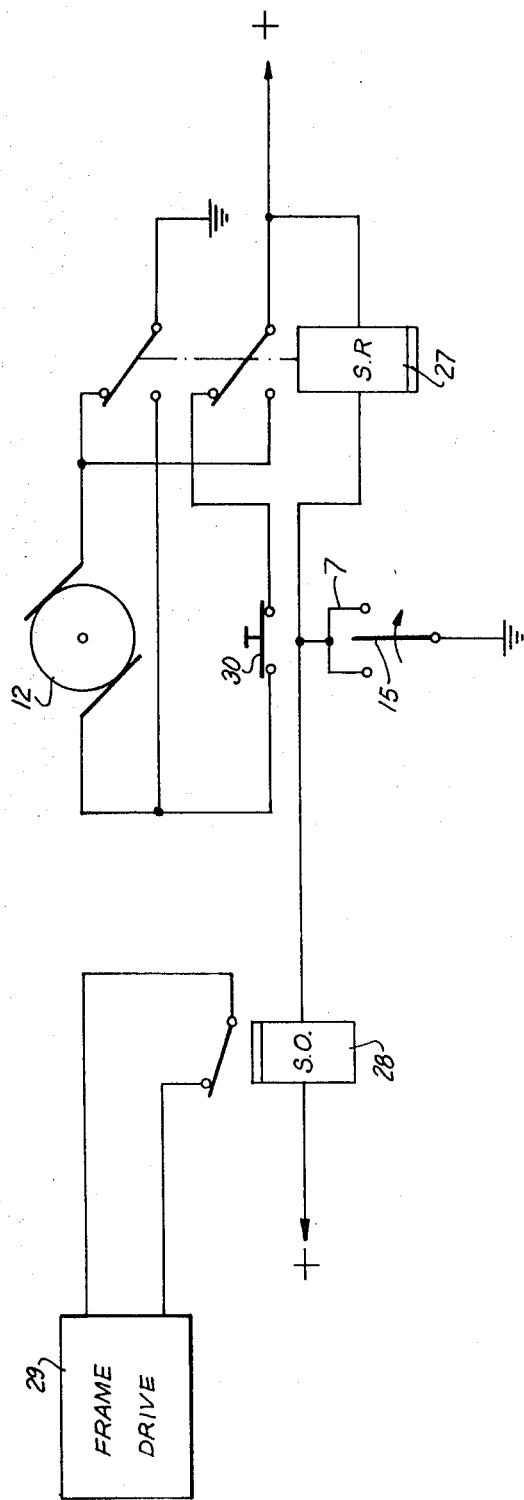
FIG. 8 is a circuit diagram of a motor-control system for an apparatus embodying my invention.

As illustrated in FIG. 8, closure of switch 7, 15 energizes a slow-releasing relay 27 to reverse the direction of rotation of drive motor 12 (or 112, 212). This switch also closes an energizing circuit for a slow-operating relay 28 which, when operated, interrupts the power supply of a drive 29 serving to advance the frame 20 (or 120, 220).

As long as all the flaps are in their normal position, motor 12 moves the nozzle body toward the vehicle until it reaches a bottom or inward position where a limit switch 30 deactivates that motor. With frame drive 29 operated to advance the nozzle support 20 etc. toward a preferably stationary vehicle wet with wash water, the first contact between a vehicular surface and the proximal flap 5 or 5' etc. closes the alternate energizing circuit of motor 12 whereby the nozzle is raised or moved outwardly until the deflected flap is free to swing back to its normal position. At this point the relay 27 is de-energized but will not release immediately in view of its delayed response characteristic; thus, the withdrawal of the nozzle continues for a short period while the portal frame straddling the vehicle moves further along its path. If the off-normal flap position is maintained for a period sufficient to operate the relay 28, the frame drive 29 stops until the deflected flap is restored to normal, thus opening the switch 7, 15; this is to prevent the nozzle structure from striking a wall of a truck or other tall vehicle. The delayed release of relay 27 minimizes "hunting," i.e. a rapid succession of ascents and descents.

Naturally, the relays 27 and 28 are representative of conventional timing circuits to achieve the desired anti-hunting and impact-preventing effects. If the frame is held stationary, the drive means 29 may serve to operate a chain, a tow bar or some other mechanism for moving the vehicle from the washing station through the drying rack.

I claim:

1. An apparatus for drying freshly washed vehicles, comprising:
   a support spaced from the path of a vehicle to be dried;
   a nozzle carried on said support for movement toward and away from said vehicle, said nozzle being provided with outlet means facing said vehicle;
   a source of drying air connected with said nozzle for discharging an air stream from said outlet means;
   sensing means on said nozzle means adjacent said outlet means for detecting an air flow reflected from a surface of said vehicle upon close approach of said nozzle to said surface;
   positioning means normally tending to move said nozzle toward the vehicle; and
   switch means controlled by said sensing means for reversing the operation of said positioning means to maintain a predetermined minimum distance between said nozzle and a vehicular surface struck by said air stream.

2. An apparatus as defined in claim 1 wherein said support and said vehicle are relatively movable along said path, said sensing means comprising an element with a normal position, a first off-normal position on one side of said normal position occupied in response to said reflected air flow, and a second off-normal position on the opposite side of said normal position occupied upon contact between said element and said vehicle due to relative movement between said vehicle and said support.

3. An apparatus as defined in claim 2 wherein said element is provided with resilient means biasing same into said normal position.

4. An apparatus as defined in claim 2 wherein said nozzle is elongate and said element is a flap extending longitudinally of said nozzle generally at right angles to said path.

5. An apparatus as defined in claim 1 wherein said sensing means comprises a pair of pivotable elements flanking said outlet means, said elements being swingable about parallel axes.

6. An apparatus as defined in claim 5 wherein said nozzle is elongate, said outlet means and said elements extending over substantially the full length of said nozzle.

7. An apparatus as defined in claim 6 wherein said outlet means forms a slot, said elements being flaps parallel to said slot.

8. An apparatus as defined in claim 7 wherein said flaps in their normal positions include opposite acute angles with a longitudinal plane of symmetry of said nozzle passing through said slot.

9. An apparatus as defined in claim 8 wherein said acute angles are substantially of 30°.

10. An apparatus as defined in claim 1 wherein said support comprises a portal frame straddling said path.

References Cited

UNITED STATES PATENTS

| 3,279,093 | 10/1966 | Dutton | 34—229 |
| 3,323,228 | 6/1967 | Maxwell | 34—229 |
| 3,442,027 | 5/1969 | Hurwitz | 34—229 |

CARROLL B. DORITY, JR., Primary Examiner

U.S. Cl. X.R.

34—229